United States Patent
Sivasubramaniam et al.

(10) Patent No.: US 6,930,471 B2
(45) Date of Patent: Aug. 16, 2005

(54) HYBRID SYNCHRONOUS/INDUCTION GENERATOR POWER PLANT

(75) Inventors: Kiruba Sivasubramaniam, Troy, NY (US); Yu Wang, Clifton Park, NY (US); Konrad Weeber, Rexford, NY (US)

(73) Assignee: General Electric Company, Schenectady, NY (US)

( * ) Notice: Subject to any disclaimer, the term of this patent is extended or adjusted under 35 U.S.C. 154(b) by 23 days.

(21) Appl. No.: 10/605,524

(22) Filed: Oct. 6, 2003

(65) Prior Publication Data

US 2005/0073284 A1 Apr. 7, 2005

(51) Int. Cl.⁷ .............................................. H02P 9/00
(52) U.S. Cl. .................... 322/45; 322/47; 310/214; 310/42
(58) Field of Search .......................... 322/20, 19, 44, 322/45, 47, 100; 310/52, 214, 261; 290/2, 52

(56) References Cited

U.S. PATENT DOCUMENTS

| | | | |
|---|---|---|---|
| 4,677,364 A | 6/1987 | Williams et al. | 322/47 |
| 4,742,288 A | 5/1988 | Sugimoto et al. | 318/818 |
| 5,548,168 A | 8/1996 | Laskaris et al. | 310/52 |
| 5,587,647 A | 12/1996 | Bansal et al. | 322/45 |
| 5,774,032 A | 6/1998 | Herd et al. | 335/216 |
| 5,929,612 A | 7/1999 | Eisenhaure et al. | 322/47 |
| 6,438,969 B1 * | 8/2002 | Laskaris et al. | 62/51.1 |
| 6,442,949 B1 | 9/2002 | Laskaris et al. | 62/51.1 |
| 6,525,504 B1 * | 2/2003 | Nygren et al. | 318/700 |
| 6,597,082 B1 | 7/2003 | Howard et al. | 310/261 |
| 6,603,231 B2 | 8/2003 | Dombrovski et al. | 310/156.01 |
| 6,668,963 B2 * | 12/2003 | Nada | 180/279 |
| 6,703,729 B2 * | 3/2004 | Weeber et al. | 310/52 |
| 6,762,517 B2 * | 7/2004 | Wang et al. | 310/42 |
| 6,815,860 B2 * | 11/2004 | Wang et al. | 310/214 |

* cited by examiner

Primary Examiner—Nicholas Ponomarenko
(74) Attorney, Agent, or Firm—Ernest Cusick; Gary M. Hartman; Domenica N. S. Hartman

(57) ABSTRACT

A power generation plant comprising a power generating unit that includes at least one first generator, such as an induction generator, coupled to at least one synchronous generator having a rotor with a superconducting (SC) coil. The induction generator and the SC synchronous generator are coupled so that the SC synchronous generator supplies the induction generator with reactive power. Sufficient reactive power is preferably generated by the SC synchronous generator to meet the demand of the induction generator for VARs, as well as permit the induction generator to have a relatively large airgap.

13 Claims, 1 Drawing Sheet

US 6,930,471 B2

HYBRID SYNCHRONOUS/INDUCTION GENERATOR POWER PLANT

BACKGROUND OF INVENTION

1. Field of the Invention

The present invention generally relates to power generation equipment and systems. More particularly, this invention relates to a power generation plant that makes use of one or more induction generators in combination with one or more superconducting synchronous generators, the latter of which are operated to produce sufficient reactive power to meet the VAR requirements of the induction generators.

2. Description of the Related Art

Virtually all large turbine-driven generators used in the production of electrical power are synchronous generators. Synchronous generators generally comprise a rotor that serves as a source of magnetic lines of flux produced by a wound coil carried on the rotor, and a stator that comprises a number of conductors in which an alternating current is induced by the rotor as it rotates within the stator, generating a rotating magnetic field in the narrow airgap between the stator and rotor. Such generators are synchronous in that the rotor is rotated at a constant speed synchronous with the rotation of the magnetic field induced in the stator, thereby producing alternating current with a constant frequency (e.g., 60 Hz of the power grid). Synchronous generators are separately excited, and therefore do not require reactive power from the grid. However, because the rotor is driven by a prime mover (e.g., a turbine), controls are necessary to ensure synchronization of the rotor speed, voltage, phase shift and phase sequence with the magnetic field induced in the stator, and therefore the power grid.

Induction generators differ from synchronous generators in that the rotor comprises a number of conductors in which alternating current flow is induced as a result of the rotor being rotated at a speed higher than the rotating magnetic field of the stator. Induction generators are not self-exciting, in that the rotating magnetic field of the stator requires an external AC power source. While less efficient, induction generators have many advantages over synchronous generators, including simplicity, robustness, and cost. Induction generators are also less sensitive to speed variations and therefore can operate in a range of speeds. However, a major disadvantage of induction generators is that they must be supplied with reactive power, or VARs (volt-ampere reactive units). The VAR requirement can be reduced by using very small airgaps between the rotor and stator (e.g., a fraction of an inch), but such a constraint renders induction generators impractical for use in power generation of large power ratings and with large generator frame sizes (e.g., above 1 MVA).

To compensate for the VARs requirement, induction generators have been used in combination with capacitor banks or synchronous condensors, the latter of which are synchronous generators run unloaded to function solely for power factor correction of the induction generator. However, such approaches are cost-prohibitive for power generation plants. Induction generators have also been operated in combination with overexcited synchronous generators, wherein the excitation from the field winding is increased above what is needed to supply the required real power, thereby generating extra VARs. A drawback with this approach is that operating a synchronous generator in an overexcited mode produces large losses in the field winding, which increases the operating temperature of the field winding. As a result, the output of VARs during overexcited generator operation is limited by the field winding temperature rise. Alternative solutions have been proposed, such as U.S. Pat. No. 4,677,364 to Williams et al., U.S. Pat. No. 4,742,288 to Sugimoto et al., and U.S. Pat. No. 5,929,612 to Eisenhaure et al. Nonetheless, it is believed that the shortcomings and limitations of the above approaches are such that large induction generators are not currently used at power generation plants.

SUMMARY OF INVENTION

The present invention provides a power generation plant comprising a power generating unit that includes at least a first generator, e.g., an induction generator, coupled to at least one synchronous generator having a rotor with a superconducting coil, such that the synchronous generator may be termed a superconducting (SC) generator. The superconducting coil is preferably a high-temperature superconducting coil, in which case the synchronous generator may be termed a high-temperature superconducting (HTS) generator. The first and synchronous generators are electrically coupled so that the synchronous generator supplies the first generator with reactive power. If the first generator is an induction generator, sufficient reactive power can be generated by a superconducting synchronous generator to permit the induction generator to have a smaller power factor, corresponding to a relatively large airgap. As a result, larger power ratings for the induction generator are more feasible.

In addition to the above, a notable advantage of the present invention is that the efficiency advantages possible with a superconducting synchronous generator, and particularly an HTS generator, can compensate for the lower efficiency of an induction generator, resulting in a hybrid power plant with acceptable overall efficiency. The use of an HTS synchronous generator also avoids the shortcomings associated with the use of conventional synchronous generators if used to compensate for the reactive power demands of an induction generator intended for power generation, including high cost and large losses. More specifically, a synchronous generator cannot operate to supply an induction generator with sufficient reactive power to meet its VAR requirements and contribute to power generation. In addition, an HTS generator can be built with sufficient margin in the field ampere-turns to run in lower lagging power factors than conventional synchronous generators. Further advantages of the present invention associated with the use of an induction generator for power generation include a more robust generator construction at large frame sizes, the opportunity to operate at variable speeds to support grid stability during system transients, the opportunity to provide short-term overload by increasing the rotor (prime mover) speed, and cost reduction.

Other objects and advantages of this invention will be better appreciated from the following detailed description.

DETAILED DESCRIPTION

Figure 1:
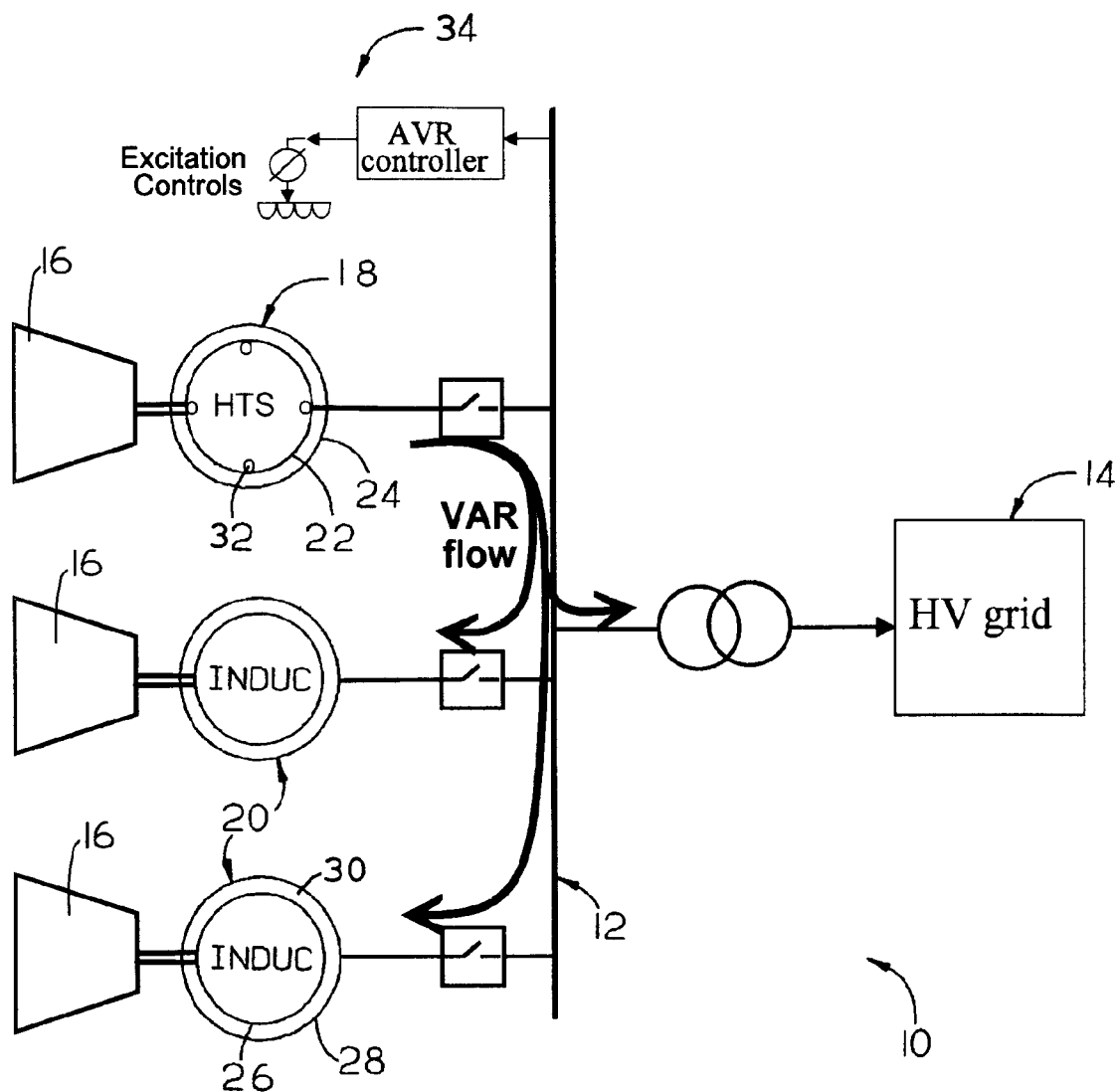
FIG. 1 schematically represents a hybrid power plant in accordance with the present invention.

FIG. 1 schematically represents a portion of a power generation plant 10 connected to a high voltage (HV) power grid or distribution network 14. As the term is used herein, a power generation plant is a large-scale facility that serves as a primary supplier of high-voltage alternating current to a distribution or transmission network, typically a three-phase alternating current system as indicated. The plant 10 represented in FIG. 1 differs from approaches for power generation with induction generators that involve reactive power compensation with capacitor banks, or synchronous condensers. FIG. 1 represents the power generation plant 10 as comprising a power generating unit 12 that includes prime movers 16, such as turbines, that individually drive a synchronous generator 18 and two induction generators 20. While a single power generating unit 12 is shown, the plant 10 could comprise any number of such units 12.

The synchronous and induction generators 18 and 20 each comprise a rotor 22 and 26, respectively, and stator 24 and 28, respectively. The induction generators 20 can be of any suitable construction, such as of the type manufactured by the General Electric Company, the assignee of the present invention. The stator 24 of the synchronous generator 18 can have a similar construction to that of the induction generators 20. Because of its synchronous operation, the rotor 22 of the synchronous generator 18 differs from the construction of the induction generator rotor 26. Furthermore, the synchronous generator rotor 22 is equipped with a superconducting (SC) coil 32, preferably a high-temperature superconducting (HTS) coil, such as of the type described in commonly-assigned U.S. Pat. No. 5,548,168 to Laskaris et al. In this regard, the coil 32 is maintained at an appropriate temperature to achieve a superconducting state in the coil material. Suitable cryogenic cooling techniques for this purpose are disclosed in commonly-assigned U.S. Pat. No. 6,442,949 to Laskaris et al. Following convention, the synchronous generator 18 will be referred to hereinafter as an HTS generator 18 equipped with an HTS rotor 22, though the use of a generator 18 that is superconducting, but not high-temperature superconducting, is also within the scope of this invention.

As represented in FIG. 1, the HTS and induction generators 18 and 20 are coupled so that the HTS generator 18 supplies the induction generators 20 with reactive power, or VARs. More preferably, the HTS generator 18 supplies the induction generators 20 with sufficient reactive power so that its demand for VARs is met, allowing smaller power factors for the induction generators 20 which corresponds to the airgaps 30 of the induction generators 20 being larger than the otherwise permitted if an attempt were made to install an induction generator of sufficient size for use in a power generation plant.

While FIG. 1 represents the unit 12 as comprising a single HTS generator 18 coupled to two induction generators 20, any number of generators 18 and 20 could be coupled to form what is depicted in FIG. 1 as a unit 12. In particular, it is envisioned that one HTS generator 18 could supply more than two induction generators 20 with sufficient reactive power to meet the VAR requirements of both generators 20.

FIG. 1 schematically represents how the generators 18 and 20 are coupled, and VAR flow therebetween. FIG. 1 also schematically represents controls 34 that enable the induction generators 20 to operate at variable speeds to support grid stability during system transients and the opportunity to provide short-term overload by increasing turbine speed.

As noted above, the induction generators 20 can be designed for power ratings far greater than previously practical in view of its VAR requirements being supplied by the HTS generator 18. In addition, the induction generators 20 can have a robust construction at large frame sizes than conventional synchronous generators used in power generation because of the large airgap 30 permitted as well as the inherent structural characteristics of induction generators.

Because of the capability to operate the induction generators 20 at variable speeds, the plant 10 is more readily able to support grid stability during system transients and to provide short-term overload by increasing the speed of the prime movers 16. All of these advantages can potentially be met while reducing the cost of power generation as a result of relying on induction generators 20 instead of conventional synchronous generators as the primary power producers. From the foregoing, those skilled in the art will also appreciate that the unit 12 results in a net efficiency gain, reduced floor size, and lower installed cost as compared to conventional approaches for power generation with induction generators that involve reactive power compensation with capacitor banks, or synchronous condensers.

While the invention has been described in terms of a particular embodiment, it is apparent that other forms could be adopted by one skilled in the art. For example, while the above description is particularly directed to addressing the VAR needs of an induction generator, the invention can be extended to all combinations of conventional generators and superconducting generators, in which the function of the latter is VAR management. For example, in applications where synchronous condensers might be used, a superconducting (SC) generator could be used in accordance with the present invention since a SC generator does not only provide VARs, but also can contribute to power generation. The benefits also extend to transmission and distribution systems, since VARs cannot be easily transmitted. Therefore, the scope of the invention is to be limited only by the following claims.

What is claimed is:

1. A power generation plant comprising a power generating unit comprising at least one first generator coupled to at least one synchronous generator having a rotor with a superconducting coil, the first generator and the synchronous generator being coupled so that the synchronous generator supplies the first generator with reactive power.

2. A power generation plant according to claim 1, wherein the synchronous generator supplies the first generator with sufficient reactive power to meet the VAR requirements of the first generator.

3. A power generation plant according to claim 1, wherein the first generator is an induction generator.

4. A power generation plant according to claim 3, wherein the induction generator is operable at non-constant speeds.

5. A power generation plant according to claim 3, wherein the unit comprises means for operating the induction generator at variable speeds to support grid stability during system transients.

6. A power generation plant according to claim 3, wherein the unit comprises means for operating the induction generator at variable speeds in response to short-term system overloads.

7. A power generation plant according to claim 1, wherein the power generating unit comprises at least two first generators coupled to a single synchronous generator.

8. A power generation plant according to claim 1, wherein the hybrid power generation plant comprises more than one of the power generating unit.

9. A power generation plant according to claim 1, wherein the first generator produces three-phase alternating current.

10. A power generation plant connected to a distribution network, the power generation plant comprising a power generating unit that comprises turbines, at least two induction generators, and at least one synchronous generator, each of the turbines driving a rotor of a corresponding one of the synchronous and induction generators, the rotor of the synchronous generator comprising a high-temperature superconducting coil at a temperature sufficient to achieve a superconducting state therein, the induction generators and the synchronous generator being coupled so that the synchronous generator supplies each of the induction generators with sufficient reactive power to meet the VAR requirements of the induction generators.

11. A power generation plant according to claim 10, wherein each of the induction generators are operable at non-constant speeds.

12. A power generation plant according to claim 10, wherein the unit comprises means for operating the induction generators at variable speeds to support grid stability during system transients.

13. A power generation plant according to claim 10, wherein the unit comprises means for operating the induction generators at variable speeds in response to short-term system overloads.

* * * * *